United States Patent
Huang

(10) Patent No.: US 10,206,234 B2
(45) Date of Patent: Feb. 12, 2019

(54) D2D COMMUNICATION CONTROL METHOD, D2D COMMUNICATION METHOD, AND APPARATUSES THEREOF

(71) Applicant: Beijing Zhigu Rui Tuo Tech Co., Ltd, Beijing (CN)

(72) Inventor: Weicai Huang, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 122 days.

(21) Appl. No.: 15/166,229

(22) Filed: May 26, 2016

(65) Prior Publication Data
US 2016/0353501 A1    Dec. 1, 2016

(30) Foreign Application Priority Data
May 29, 2015 (CN) .......................... 2015 1 0288700

(51) Int. Cl.
*H04W 76/14* (2018.01)
*H04W 52/38* (2009.01)

(52) U.S. Cl.
CPC ......... *H04W 76/14* (2018.02); *H04W 52/383* (2013.01)

(58) Field of Classification Search
CPC .... H04W 76/023; H04W 52/34; H04W 52/36
See application file for complete search history.

(56) References Cited

U.S. PATENT DOCUMENTS 9,319,124 B2 *  4/2016  Seol ..................... H04B 7/0628
9,319,931 B2    4/2016  Lim et al.
9,781,731 B2 *  10/2017 Chen ........................ H04W 4/08
9,820,287 B2 *  11/2017 Fujishiro ............... H04L 1/0003
2007/0082692 A1  4/2007  Tirkkonen et al.
(Continued)

FOREIGN PATENT DOCUMENTS

CN      104113832 A      10/2014
CN      104244392 A      12/2014
(Continued)

OTHER PUBLICATIONS

Fodor, et al. "A Distributed Power Control Scheme for Cellular Network Assisted D2D Communications", 2011 IEEE Global Telecommunications Conference (GLOBECOM 2011). Dec. 2011. 6 pages.
(Continued)

*Primary Examiner* — Hashim S Bhatti
(74) *Attorney, Agent, or Firm* — Amin, Turocy & Watson, LLP

(57) ABSTRACT

A device to device (D2D) communication control method, a D2D communication method, and apparatuses thereof are provided. A method comprises: in response to that at least one party in both parties of communication has a directional transmission capability, determining to establish a D2D communication link using directional transmission; and determining a power control strategy associated with the directional transmission of the D2D communication link. Possible directional D2D transmission can be considered according to directional transmission capability of at least one party in both parties of communication, and a power control strategy specific to the directional D2D transmission can be made, thereby having higher flexibility, and being conducive to suppressing interference more effectively.

40 Claims, 5 Drawing Sheets

(56) References Cited

U.S. PATENT DOCUMENTS

| | | | |
|---|---|---|---|
| 2007/0287384 A1* | 12/2007 | Sadri | H04W 76/028 455/63.4 |
| 2009/0015478 A1* | 1/2009 | Li | H04B 7/086 342/377 |
| 2009/0019150 A1* | 1/2009 | Li | H04B 7/086 709/224 |
| 2011/0103317 A1 | 5/2011 | Ribeiro et al. | |
| 2013/0078991 A1 | 3/2013 | Nam | |
| 2013/0208587 A1 | 8/2013 | Bala et al. | |
| 2014/0153390 A1 | 6/2014 | Ishii et al. | |
| 2014/0219095 A1* | 8/2014 | Lim | H04W 72/085 370/235 |
| 2014/0235287 A1* | 8/2014 | Maltsev | H04W 52/267 455/522 |
| 2014/0274088 A1 | 9/2014 | Talwar et al. | |
| 2014/0321367 A1 | 10/2014 | Marupaduga et al. | |
| 2015/0049736 A1* | 2/2015 | Liu | H04W 72/04 370/331 |
| 2015/0119088 A1 | 4/2015 | Lee et al. | |
| 2015/0222345 A1* | 8/2015 | Chapman | H04B 7/0617 370/332 |
| 2015/0288427 A1* | 10/2015 | Wang | H04W 72/1273 370/329 |
| 2015/0373730 A1* | 12/2015 | Fujishiro | H04L 1/0003 455/450 |
| 2015/0382290 A1 | 12/2015 | Yaacoub | |
| 2016/0183286 A1 | 6/2016 | Park et al. | |
| 2016/0270106 A1* | 9/2016 | Zhou | H04W 76/14 |
| 2016/0352484 A1 | 12/2016 | Wei et al. | |
| 2016/0352485 A1 | 12/2016 | Wei et al. | |
| 2017/0041974 A1* | 2/2017 | Liao | H04W 76/14 |

FOREIGN PATENT DOCUMENTS

| | | |
|---|---|---|
| CN | 104270712 A | 1/2015 |
| CN | 104284407 A | 1/2015 |
| CN | 104301984 A | 1/2015 |
| CN | 104488332 A | 4/2015 |

OTHER PUBLICATIONS

Yu, et al. "On the Performance of Device-to-Device Underlay Communication with Simple Power Control", IEEE 69th Vehicular Technology Conference, 2009. VTC Spring 2009. Apr. 2009. 5 pages.

Xing, et al. "The investigation of power control schemes for a device-to-device communication integrated into OFDMA cellular system", 2010 IEEE 21st International Symposium on Personal, Indoor and Mobile Radio Communications, Sep. 2010. 6 pages.

Office Action dated Oct. 6, 2017 for U.S. Appl. No. 15/167,809, 23 pages.

Office Action dated Apr. 6, 2018 for U.S. Appl. No. 15/166,257, 44 pages.

Office Action dated Mar. 8, 2018 for U.S. Appl. No. 15/166,240, 24 pages.

Office Action dated May 25, 2018 for U.S. Appl. No. 15/166,252, 48 pages.

Office Action dated May 10, 2018 for U.S. Appl. No. 15/167,809, 18 pages.

Office Action dated Oct. 11, 2018 for U.S. Appl. No. 15/166,240, 27 pages.

Office Action dated Oct. 23, 2018 for U.S. Appl. No. 15/166,252, 24 pages.

* cited by examiner

D2D COMMUNICATION CONTROL METHOD, D2D COMMUNICATION METHOD, AND APPARATUSES THEREOF

RELATED APPLICATION

The present application claims the benefit of priority to Chinese Patent Application No. 201510288700.X, filed with the Chinese Patent Office on May 29, 2015, and entitled "D2D COMMUNICATION CONTROL METHOD, D2D COMMUNICATION METHOD, AND APPARATUS THEREOF", which application is hereby incorporated herein by reference in its entirety.

TECHNICAL FIELD

Embodiments of the present application relate to the field of Device to Device (D2D) communication technologies, and, for example, to a D2D communication control method, a D2D communication method, and apparatuses thereof.

BACKGROUND

D2D technologies allow direct communication between terminal devices, and therefore, frequency spectrum efficiency of a cellular communication system may be effectively improved, transmit power of a terminal is reduced, and a problem of lack of frequency spectrum resources of a wireless communication system may be solved to some extent. The D2D mode has been accepted by the 3GPP standards organizations, is applied to a long term evolution (LET) communication system, and has a very broad application prospect.

In a D2D application scenario at least partially covered by a cellular network, in the case where a D2D device uses a dedicated channel, communication in the cellular network will not be interfered. However, when the density of users in a cell is high, the D2D communication will share or reuse frequency resources of cellular users. When the D2D communication and cellular communication reuse the same wireless resource, mutual interference will occur. By controlling the transmit power of a D2D signal, the interference of the D2D communication to the co-frequency cellular communication can be reduced.

SUMMARY

Therefore, one example, non-limiting object of one or more example embodiments of the present application is to provide a D2D communication control solution having higher flexibility and higher interference inhibition efficiency.

A first aspect of one or more example embodiments of the present application provides a D2D communication control method, comprising:

in response to that at least one party in both parties of communication has a directional transmission capability, determining to establish a D2D communication link using directional transmission; and determining a power control strategy associated with the directional transmission of the D2D communication link.

In a second aspect, an example embodiment of the present application provides a D2D communication method, and the method comprises:

receiving a power control strategy associated with the directional transmission of the D2D communication link; and implementing D2D communication at least according to the power control strategy.

In a third aspect, an example embodiment of the present application provides a D2D communication control apparatus, and the apparatus comprises:

a first determination module, configured to: in response to that at least one party in both parties of communication has a directional transmission capability, determine to establish a D2D communication link using directional transmission; and a second determination module, configured to determine a power control strategy associated with the directional transmission of the D2D communication link.

In a fourth aspect, an example embodiment of the present application provides a D2D communication apparatus, and the apparatus comprises:

a second reception module, configured to receive a power control strategy associated with the directional transmission of the D2D communication link; and a D2D communication module, configured to implement D2D communication at least according to the power control strategy.

In a fifth aspect, an example embodiment of the present application provides a computer readable storage device, comprising at least one executable instruction, which, in response to execution, causes a system comprising a processor to perform operations, comprising:

in response to that at least one party in both parties of communication has a directional transmission capability, determining to establish a D2D communication link using directional transmission; and determining a power control strategy associated with the directional transmission of the D2D communication link.

In a sixth aspect, an example embodiment of the present application provides a device for device to device (D2D) communication control comprising a processor and memory, wherein the memory storing a computer executable instruction, the processor being connected with the memory via a communication bus, and when the device is operating, the processor executes or facilitates execution of the executable instructions stored by the memory:

in response to that at least one party in both parties of communication has a directional transmission capability, determining to establish a D2D communication link using directional transmission; and determining a power control strategy associated with the directional transmission of the D2D communication link.

In a seventh aspect, an example embodiment of the present application provides a computer readable storage device, comprising at least one executable instruction, which, in response to execution, causes a system comprising a processor to perform operations, comprising:

receiving a power control strategy associated with directional transmission of a D2D communication link; and performing D2D communication at least according to the power control strategy.

In an eighth aspect, an example embodiment of the present application provides a device to device (D2D) communication device comprising a processor and memory, wherein the memory storing a computer executable instruction, the processor being connected with the memory via a communication bus, and when the device is operating, the processor executes or facilitates execution of the executable instructions stored by the memory:

receiving a power control strategy associated with directional transmission of a D2D communication link; and performing D2D communication at least according to the power control strategy.

The methods and apparatuses of one or more of the example embodiments of the present application can consider possible directional D2D transmission according to directional transmission capability of at least one party in both parties of communication, and make a power control strategy specific to the directional D2D transmission, thereby having higher flexibility, and being conducive to suppress interference more effectively.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Example embodiments of the present application are further described in detail through accompanying drawings and corresponding description. The following embodiments are used to describe the present application, but are not intended to limit the scope of the present application.

Persons skilled in the art should understand that terms such as "first" and "second" in the present application are merely used to distinguish different devices, modules, parameters or the like, and the terms neither represent any specific technical meanings nor indicate necessary logic orders of them.

In the embodiments of the present application, the "directional transmission" refers to transmission of a radio frequency signal in a specific direction (also referred to as directed transmission) implemented with one or more directional transmit antennas, and comprises: transmission in a specific sector direction, or transmission to one receiving end through multiple paths (for example, directional transmit implemented by conducting beam forming with a smart antenna technique). "Directional transmit" refers to transmitting a radio frequency signal in a certain angle range so that it can be directionally transmitted. "Directional D2D" refers to D2D communication using the directional transmission over a D2D link. Along with development of intelligentization of terminals, more and more terminal devices start to have the directional transmission capability, for example, a terminal implements directional transmission in a manner of beam forming by being provided with a smart antenna. The directional transmission can form spatial separation of co-frequency users (users transmitting signals by using the same frequency), thereby reducing interference between the co-frequency users. Directed to possible directional D2D transmission, power control does not need to be implemented blindly, and there may be even no limitation related to the interference condition of the co-frequency cellular user on the transmit power of the D2D signal. Based on this, the embodiments of the present application provide a power control solution based on directional D2D transmission with higher flexibility and higher interference suppression efficiency.

Figure 1:
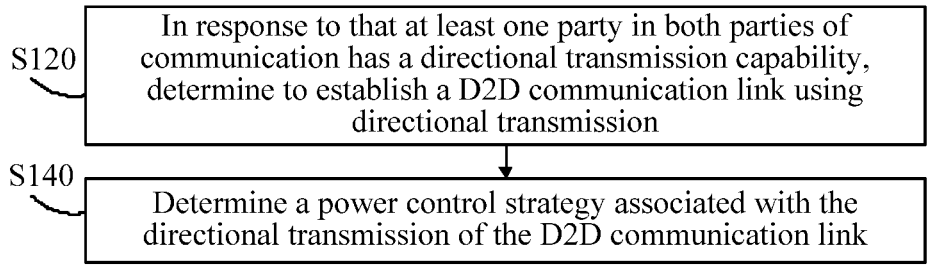
FIG. 1 is an example schematic flow chart of an example of a D2D communication control method according to an embodiment of the present application.

FIG. 1 is a flow chart of a D2D communication control method according to an embodiment of the present application. The method may be executed by a base station, and may also be executed by an independent apparatus. As shown in FIG. 1, the method comprises:

S120: In response to that at least one party in both parties of communication has a directional transmission capability, determine to establish a D2D communication link using directional transmission.

Because of the success of the directional D2D transmission in reducing the interference between co-frequency users, the method of this embodiment determines that a D2D communication link using directional transmission (also referred to as a directional D2D communication link hereinafter) can be established between devices of both parties of communication in a case that the directional transmission is supported between the two.

S140: Determine a power control strategy associated with the directional transmission of the D2D communication link.

Directed to the directional D2D communication link, a power control strategy of the D2D transmit power which is not limited by the interference condition of a co-frequency cellular user (interference level of the interference on an uplink signal sent by the co-frequency cellular user to a base station caused by a signal transmitted over the D2D communication link) or is less limited by the interference condition of the co-frequency cellular user may be determined, and such power control strategy is different from a power control strategy not related to the directional D2D transmission. The power control not related to the directional transmission may be concerned only with limiting the transmit power of the D2D signal, and it is needed to, for example, make a specific limitation strategy to the transmit power of the D2D signal according to the interference condition of the co-frequency cellular user, the implementation process of which is complex.

In view of the foregoing, the method of example embodiments of the present application can consider possible directional D2D transmission according to directional transmission capability of at least one party in both parties of communication, and make a power control strategy specific to the directional D2D transmission, thereby having higher flexibility, and being conducive to suppress interference more effectively.

The determining to establish the D2D communication link using the directional transmission in step S120 may comprise: an execution apparatus of the embodiment of the present application actively determines that the directional D2D communication link can be established, and establishes or controls to establish the D2D communication link. Or, the execution apparatus of the method of this embodiment may respond to a D2D communication requirement between terminal devices, determine whether a directional D2D communication link can be established between the involved terminal devices, and establish or control to establish the D2D communication link. The establishment of the directional D2D communication link may be implemented by using, for example, an interaction process required for establishment of a communication link and well-known by persons skilled in the art. In an example embodiment in which establishment of the directional D2D communication link is determined in response to a D2D communication requirement between terminal devices, the method of this embodiment further comprises:

S112: Receive request information associated with the establishment of the D2D communication link.

That is, when there is a D2D communication requirement between terminal devices, a device of at least one party initiates a request of establishing a D2D communication link to a base station of a cellular cell, in order to acquire a resource associated with conducting D2D communication.

S114: In response to the received request information, determine a directional transmission capability of at least one party of both parties of communication.

In an example embodiment, the directional transmission capability of a device of any party in both parties of communication may be known, for example, it has been reported to the base station of the cellular cell before, and the execution apparatus of the method of this embodiment may determine, in response to the request information, the directional transmission capability of at least one party of both parties of communication.

In another example embodiment, the directional transmission capability of a device of any party in both parties of communication is unknown, but may be comprised in the request information. For example, the request information clearly indicates that a device of at least one party can conduct directional transmit. As a response, the execution apparatus of the method of this embodiment can determine, according to the request information, that the both parties of communication support directional D2D transmission, thereby determining to establish a D2D communication link using directional transmission between the two parties. In still another example embodiment, the directional transmission capability of a device of any party in both parties of communication is unknown, and the execution apparatus of the method of this embodiment may respond to the received request information, determine, by for example communicating with at least one part in the both parties of communication, whether the both parties of communication support directional D2D transmission, thereby determining whether a D2D communication link using the directional transmission can be established between the two. In such an example embodiment, the step S114 may further comprise:

S1142: Send a query associated with the directional transmission capability.

S1144: Receive information associated with the directional transmission capability of at least one party in the both parties of communication.

In still another example embodiment, the request information may comprise information associated with using directional transmission over the D2D communication link, and the information indicates that the D2D communication link relates to the directional transmission, that is, indirectly indicates that at least one party in the both parties of communication has the directional transmission capability. In such an implementation manner, the step S114 may further comprise:

S1146: In response to that the request information comprises the information associated with using directional transmission over the D2D communication link, determine that at least one party in the both parties of communication has the directional transmission capability.

The information associated with using the directional transmission over the D2D communication link comprises information associated with at least one of the following: a sender device of the D2D communication link will use directional emission over the D2D communication link, a directional coefficient of the directional transmit, the sender device uses a beam forming technology over the D2D communication link, or any other information that can indicate the D2D communication link relates to the directional transmission.

It should be noted that, devices of the both parties of communication corresponding to the directional D2D communication link determined to establish first should be with the capability of supporting the D2D communication, and the execution apparatus of the method of this embodiment needs to perform confirmation on this before determining to establish the D2D communication link using the directional transmission, and this process is a relatively mature technology in the art, and is not repeated herein.

Moreover, in the method of this embodiment, various possible power control strategies may be determined more flexibly directed to the possible directional D2D transmission. In an example embodiment, the transmit power of the D2D signal may be determined without considering the interference condition of the co-frequency cellular user (the interference of the uplink signal sent by the co-frequency cellular user to the base station caused by the D2D signal), and an upper limit of the D2D transmit power is limited only according to the existing D2D transmit power control manner. In such an example embodiment, the step S140 may further comprise:

S141: Determine a transmit power upper limit at least associated with a target received power of the serving cell base station of the D2D communication link.

For example, but not limited to: the maximum transmit power $PNC,D2D(i)$ of a D2D signal of the $i^{th}$ subframe is limited as:

$$PNC,D2D(i)=B+PO\_D2D+\alpha D2D \cdot PLD2D+\Delta TF,D2D(i)+fD2D(i)$$

Where $PO\_D2D$ is a target received power of the serving cell base station to the D2D signal, $\alpha D2D$ is a compensation factor, and $0 \leq \alpha D2D \leq 1$, $PLD2D$ is a path loss of the D2D communication link, $\Delta TF,D2D(i)$ is a power adjustment parameter determined by a modulation order of the D2D transmission of the $i^{th}$ subframe, $fD2D(i)$ is a closed-loop adjustment amount of the $i^{th}$ subframe controlled by a D2D transmission closed-loop power control command, $B=0$ or $B=10 \log 10(MD2D(i))$, and $MD2D(i)$ is a D2D transmission bandwidth of the $i^{th}$ subframe.

For another example, but not limited to, the transmit power upper limit of the D2D signal is determined according to the maximum transmit power of a sender device, and the maximum transmit power of the sender device is an inherent attribute of the device. That is, step S140 may further comprise:

S142: Determine a D2D signal transmit power upper limit at least associated with the maximum transmit power of the sender device of the D2D communication link, for example, determine that the D2D signal transmit power upper limit does not exceed the maximum transmit power of the sender device.

In another example embodiment, in consideration that in the case of directional D2D transmission, a certain level of interference will possibly be caused to the uplink signal of the serving cell cellular user, a corresponding power control strategy may be determined according to the interference condition of the serving cell base station, and in such an example embodiment, step S140 may further comprise:

S143: Determine a transmit power upper limit at least associated with the interference condition of the serving cell base station of the D2D communication link.

In still another example embodiment, in consideration that in the case of directional D2D transmission, a certain level of interference will possibly be caused to the uplink signal of a co-frequency cellular user of a neighboring cell, a corresponding power control strategy may be determined according to the interference condition of a neighboring cell base station, and in such an implementation manner, step S140 may further comprise:

S144: Determine a transmit power upper limit at least associated with the interference condition of the neighboring cell base station of the D2D communication link.

It should be noted that, the interference condition of the serving cell base station and the interference condition of the neighboring cell base station may be measured by any mature technology in the art, for example, the influence level of the D2D signal on other uplink signals received by the base station may be determined by respectively detecting a difference between signal-to-noise ratios of a reused time-frequency resource and a non-reused time-frequency resource during the D2D transmission, a difference between bit error ratios (BER), and the like, and other appropriate manners may also be used, which are not described in detail herein.

In yet another example embodiment, in consideration that when a distance between both parties of the directional D2D communication is much less than a distance between the both parties of communication and the serving cell base station, the D2D signal will not cause any interference on other co-frequency uplink signals received by the base station, and the power control strategy may be determined merely according to positions of devices of the both parties of the directional D2D communication, for example, the D2D signal transmit power upper limit is determined according to step S141. In such an example embodiment, the step S140 may further comprise:

S145: Determine the transmit power upper limit at least associated with the positions of the both parties of communication.

The positions of the both parties of communication may be reported to the base station by GPS modules of the both parties of communication, or may be determined according to a direction of arrival (DOA) of a signal of each party of communication received by the base station.

In view of the foregoing, directed to the directional D2D transmission, the method of this embodiment may use a more flexible power control strategy.

Moreover, the method of the embodiment of the present application may further comprise:

S160: Send information associated with the power control strategy.

According to different execution apparatuses of the method of this embodiment, in step S160, the information may be sent to the base station or to at least one party in the both parties of D2D communication, for the both parties of communication to implement the D2D communication.

In view of the foregoing, the D2D communication control method of the embodiment of the present application has a higher flexibility, and is conducive to achieving higher interference suppression efficiency.

Figure 2:
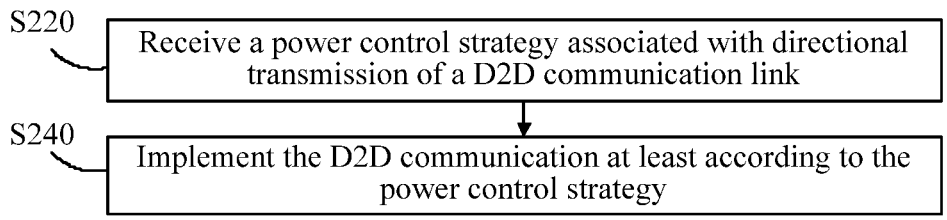
FIG. 2 is an example schematic flow chart of an example of a D2D communication control method according to an embodiment of the present application.

Moreover, the present application further provides a D2D communication method; the method may be executed by any terminal device having a directional transmission capability, and may also be executed by an independent apparatus. As shown in FIG. 2, the method includes:

S220: Receive a power control strategy associated with directional transmission of a D2D communication link.

As described with reference to FIG. 1, for the terminal device having the directional transmission capability, a directional D2D communication link may be established, and directed to the directional D2D communication link, a power control strategy of the D2D transmit power which is not limited by the interference condition of a co-frequency cellular user or is less limited by the interference condition of the co-frequency cellular user may be determined, and such a power control strategy is different from a power control strategy not related to the directional D2D transmission. The power control not related to the directional transmission may be concerned only with limiting the transmit power of the D2D signal, and it is needed to, for example, make a specific limitation strategy to the transmit power of the D2D signal according to the interference condition of the co-frequency cellular user, the implementation process of which is complex. In the method of this embodiment, a power control strategy from the serving cell base station side is received in order to implement the directional D2D transmission.

S240: Perform the D2D communication at least according to the power control strategy, for example, transmit a directional D2D signal with a power not exceeding the transmit power upper limit specified in the power control strategy.

In view of the foregoing, the method of this embodiment implements the directional D2D communication according to the power control strategy associated with the directional transmission, thereby having higher interference suppression efficiency.

Still as described with reference to FIG. 1, the establishment of the directional D2D communication link may be initiated by the base station side, and may also be initiated by sending a D2D communication request to the base station side in response to a D2D communication requirement between terminal devices, in order to acquire a resource associated with conducting the D2D communication. In such an example embodiment, the method of this embodiment further comprises:

S212: Send request information associated with the establishment of the D2D communication link.

Still as described in the foregoing embodiment, the establishment of the communication link is determined in response to that at least one party in both parties of communication has the directional transmission capability. In an example embodiment, the execution apparatus of the method of this embodiment may comprise the information associated with the directional transmission capability of the device of at least one party in the both parties of communication in the request information, for example, it is clearly indicated in the request information that the device of at least one party can conduct directional transmit, so that the base station side can determine, according to the request information, that the both parties of communication support the directional D2D transmission, thereby determining that the directional D2D communication link can be established. In another example embodiment, in response to a query of the base station side, information associated with the directional transmission capability of the device of any party in both parties of communication may be reported to the base station side. In such an example embodiment, the method further comprises:

S232: Receive a query associated with the directional transmission capability of at least one party of the both parties of communication.

S234: Send information associated with the directional transmission capability of at least one party in both parties of communication.

In still another example embodiment, the execution apparatus of the method of the embodiment of the present application may comprise information associated with using directional transmission over the D2D communication link in the request information, and the information indicates that the D2D communication link related to the directional transmission, that is, indirectly indicates that at least one party in the both parties of communication has the directional transmission capability.

The information associated with using the directional transmission over the D2D communication link comprises information associated with at least one of the following: a sender device of the D2D communication link will use directional emission over the D2D communication link, a directional coefficient of the directional transmit, the sender device uses a beam forming technology over the D2D communication link, or any other information that can indicate the D2D communication link involves the directional transmission.

It should be noted that, the both parties implementing the directional D2D transmission first should have the capability of supporting the D2D communication, the execution apparatus of the method of this embodiment will respond to this when the base station side confirms this, and this process is a relatively mature technology in the art, which is not repeated herein.

Moreover, still as described with reference to FIG. 1, in the method of this embodiment, the power control strategy may comprise: a transmit power upper limit at least associated with a target receiving power of the serving cell base station of the D2D communication link; a D2D signal transmit power upper limit at least associated with the maximum transmit power of a sender device of the D2D communication link, for example, the D2D signal transmit power upper limit does not exceed the maximum transmit power of the sender device; a transmit power upper limit at least associated with the interference condition of the serving cell base station of the D2D communication link; an transmit power upper limit at least associated with the interference condition of a neighboring cell base station of the D2D communication link; and/or an transmit power upper limit at least associated with positions of both parties of communication.

In an example embodiment that the power control strategy comprises a transmit power upper limit at least associated with positions of both parties of communication, the method of this embodiment may further comprise a step of reporting the information associated with the positions of the both parties of communication to the base station.

In view of the foregoing, the method of this embodiment may implement D2D communication according to a more flexible power control strategy.

A person skilled in the art should understand that in the above method of the various embodiments of the present application, serial numbers of steps do not indicate priorities of execution sequences, the execution sequences of the steps should be determined according to functions and inner logic thereof, and should not constitute a limitation to implementation processes of the various embodiments of the present application.

In addition, an embodiment of the present application further provides a computer readable medium, comprising computer readable instructions for performing the following operations when being executed: executing operations of the steps in the method in the example embodiment shown in FIG. 1.

In addition, an embodiment of the present application further provides a computer readable medium, comprising computer readable instructions for performing the following operations when being executed: executing operations of the steps in the method in the example embodiment shown in FIG. 2.

Figure 3A:
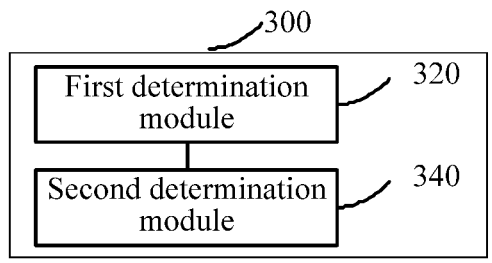
FIG. 3(a) to FIG. 3(d) are example schematic structural diagrams of various examples of a D2D communication control apparatus according to an embodiment of the present application.

An embodiment of the present invention further provides an apparatus executing the power control method. The apparatus may be an independent apparatus, and may also be an apparatus belonging to a base station. According to requirements of different execution roles of the apparatus, in addition various components described in the following, the apparatus may further comprise a communication module that may implement communication with any device external to the apparatus as required. As shown in FIG. 3(a), a D2D communication control apparatus 300 of the embodiment of the present application comprises: a first determination module 320 and a second determination module 340.

The first determination module 320 is configured to: in response to that at least one party in both parties of communication has a directional transmission capability, determine to establish a D2D communication link using directional transmission.

Because of the superior advantage of the directional D2D transmission in reducing the interference between co-frequency users, the first determination module 320 determines that a D2D communication link using directional transmission (also referred to as a directional D2D communication link hereinafter) can be established between devices of both parties of communication in a case that the directional transmission is supported between the two.

The second determination module 340 is configured to determine a power control strategy associated with the directional transmission of the D2D communication link.

Directed to the directional D2D communication link, a power control strategy of the D2D transmit power which is not limited by the interference condition of a co-frequency cellular user or is less limited by the interference condition of the co-frequency cellular user may be determined, and such a power control strategy is different from a power control strategy not related to the directional D2D transmission. The power control not related to the directional transmission may be concerned only with limiting the transmit power of the D2D signal, and it is needed to, for example, make a specific limitation strategy for the transmit power of the D2D signal according to the interference condition of the co-frequency cellular user, the implementation process of which is complex.

In view of the foregoing, the apparatus of the embodiments of the present application can consider possible directional D2D transmission according to directional transmission capability of at least one party in both parties of communication, and make a power control strategy specific to the directional D2D transmission, thereby having higher flexibility, and being conducive to suppress interference more effectively.

Figure 3B:
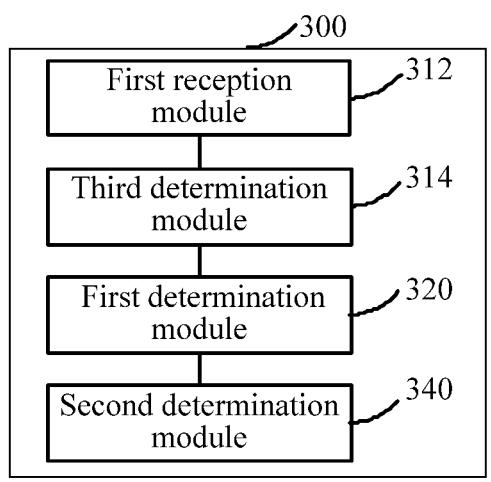

The first determination module 420 determining to establish the D2D communication link using the directional transmission may comprise: actively determining that the D2D communication link can be established, and establishing or controlling to establish the D2D communication link. Or, the first determination module 420 may respond to a D2D communication requirement between terminal devices, determine whether a directional D2D communication link can be established between the involved terminal devices, and establish or control to establish the D2D communication link. The establishment of the directional D2D communication link may be implemented by using, for example, an interaction process required for establishment of a communication link and well-known by persons skilled in the art. In an example embodiment in which establishment of the directional D2D communication link is determined in response to a D2D communication requirement between user equipments, as shown in FIG. 3(b), the apparatus 300 of this embodiment further comprises: a first reception module 312 and a third determination module 314.

The first reception module 312 is configured to receive request information associated with establishment of the D2D communication link.

That is, when there is a D2D communication requirement between terminal devices, a device of at least one party initiates a request of establishing a D2D communication link to a base station of a cellular cell, in order to acquire a resource associated with conducting D2D communication.

The third determination module 314 is configured to: in response to the received request information, determine a directional transmission capability of at least one party in both parties of communication.

In an example embodiment, the directional transmission capability of a device of any party in both parties of communication may be known, for example, it has been reported to the base station of the cellular cell before by the terminal device, and the apparatus of this embodiment may determine, in response to the request information, the directional transmission capability of at least one party of both parties of communication.

Figure 3C:
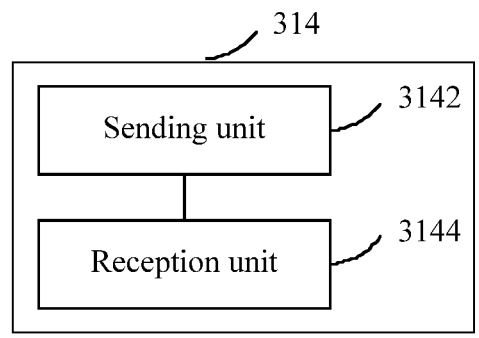
Figure 3D:
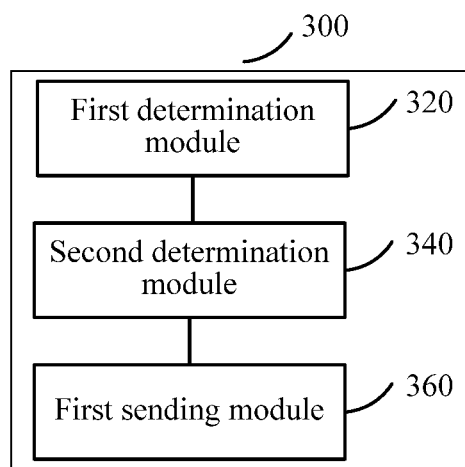

In another example embodiment, the directional transmission capability of any party in both parties of communication is unknown, but may be comprised in the request information. For example, the request information clearly indicates that a device of at least one party can conduct directional transmit. As a response, the apparatus of this embodiment can determine, according to the request information, that the both parties of communication support directional D2D transmission, thereby determining to establish a D2D communication link using directional transmission between the two parties. In still another example embodiment, the directional transmission capability of a device of any party in both parties of communication is unknown, and the apparatus 300 of this embodiment may respond to the received request information, determine, by for example communicating with at least one part in the both parties of communication, whether the both parties of communication support directional D2D transmission, thereby determining whether a D2D communication link using the directional transmission can be established between the two. In such an example embodiment, as shown in FIG. 3(c), the third determination module 314 may further comprise: a sending unit 3142 and a reception unit 3144.

The sending unit 3142 is configured to send a query associated with the directional transmission capability.

The reception unit 3144 is configured to receive information associated with the directional transmission capability of at least one party in both parties of communication.

In still another example embodiment, the request information may comprise information associated with using directional transmission over the D2D communication link, and the information indicates that the D2D communication link relates to the directional transmission, that is, indirectly indicates that at least one party in the both parties of communication has the directional transmission capability. In such an example embodiment, the third determination module 314 may be configured to, in response to that the request information comprises the information associated with using directional transmission over the D2D communication link, determine that at least one party in both parties of communication has the directional transmission capability.

The information associated with using the directional transmission over the D2D communication link comprises information associated with at least one of the following: a sender device in of the D2D communication link will use directional emission over the D2D communication link, a directional coefficient of the directional transmit, the sender device uses a beam forming technology over the D2D communication link, or any other information that can indicate the D2D communication link relates to the directional transmission.

It should be noted that, devices of the both parties of communication corresponding to the directional D2D communication link determined to establish first should possess the capability of supporting the D2D communication, and the apparatus of this embodiment needs to perform confirmation on this before determining to establish the D2D communication link using the directional transmission, and this process is a relatively mature technology in the art, and is not repeated herein.

Moreover, in the apparatus of this embodiment, various possible power control strategies may be determined flexibly directed to the possible directional D2D transmission. In an example embodiment, the transmit power of the D2D signal may be determined without considering the interference condition of the co-frequency cellular user (the interference of the uplink signal sent by the co-frequency cellular user to the base station caused by the D2D signal), and an upper limit of the D2D transmit power is limited only according to the existing D2D transmit power control manner. In such an example embodiment, the second determination module 340 may be further configured to determine a transmit power upper limit at least associated with a target received power of the serving cell base station of the D2D communication link.

For example, but not limited to: the maximum transmit power $PNC,D2D(i)$ of a D2D signal of the $i^{th}$ subframe is limited as:

$$PNC,D2D(i)=B+PO\_D2D+\alpha D2D \cdot PLD2D+\Delta TF,D2D(i)+fD2D(i)$$

Where PO_D2D is a target received power of the serving cell base station to the D2D signal, $\alpha D2D$ is a compensation factor, and $0 \le \alpha D2D \le 1$, PLD2D is a path loss of the D2D communication link, $\Delta TF,D2D(i)$ is a power adjustment parameter determined by a modulation order of the D2D transmission of the $i^{th}$ subframe, $fD2D(i)$ is a closed-loop adjustment amount of the $i^{th}$ subframe controlled by a D2D transmission closed-loop power control command, B=0 or B=10 log 10(MD2D(i)), and MD2D(i) is a D2D transmission bandwidth of the $i^{th}$ subframe.

For another example, but not limited to, the transmit power upper limit of the D2D signal is determined according to the maximum transmit power of a sender device, and the maximum transmit power of the sender device is an inherent attribute of the device. That is, the second determination module 340 may be further configured to determine a D2D signal transmit power upper limit at least associated with the maximum transmit power of the sender device of the D2D communication link, for example, determine that the D2D signal transmit power upper limit does not exceed the maximum transmit power of the sender device.

In another example embodiment, in consideration that in the case of directional D2D transmission, a certain degree of interference will possibly be caused to the uplink signal of the local cell cellular user, a corresponding power control strategy may be determined according to the interference condition of a local cell base station, and in such an example embodiment, the second determination module 340 may further be configured to determine a transmit power upper limit at least associated with the interference condition of the local cell base station of the D2D communication link.

In still another example embodiment, in consideration that in the case of directional D2D transmission, a certain degree of interference will possibly be caused to the uplink signal of a co-frequency cellular user of a neighboring cell, a corresponding power control strategy may be determined according to the interference condition of a neighboring cell base station, and in such an example embodiment, the second determination module 340 may further be configured to determine a transmit power upper limit at least associated with the interference condition of the neighboring cell base station of the D2D communication link.

It should be noted that, the interference condition of the serving cell base station and the interference condition of the neighboring cell base station may be measured by any mature technology in the art, for example, the influence level of the D2D signal on other uplink signals received by the base station may be determined by respectively detecting a difference between signal-to-noise ratios of a reused time-frequency resource and a non-reused time-frequency resource during the D2D transmission, a difference between bit error ratios (BER), and the like, and other appropriate manners may also be used, which are not described in detail herein.

In yet another example embodiment, in consideration that when a distance between both parties of the directional D2D communication is much less than a distance between the both parties of communication and the serving cell base station, the D2D signal will not cause any interference on other co-frequency uplink signals received by the base station, and the power control strategy may be determined merely according to positions of devices of the both parties of the directional D2D communication. In such an example embodiment, the second determination module 340 may further be configured to determine a transmit power upper limit at least associated with the positions of the both parties of communication.

The positions of the both parties of communication may be reported to the base station by GPS modules of the both parties of communication, or may be determined according to a direction of arrival (DOA) of a signal of each party of communication received by the base station.

In view of the foregoing, directed to the directional D2D transmission, the apparatus of this embodiment may use a more flexible power control strategy.

Moreover, as shown in FIG. 3(*d*), the apparatus 300 of the embodiment of the present application may further comprise:

a first sending module 360, configured to send information associated with the power control strategy.

According to different roles of the apparatus of this embodiment, the first sending module 360 may send the information to the base station or to at least one party in the both parties of D2D communication, for the both parties of communication to implement the D2D communication.

In view of the foregoing, the D2D communication control apparatus of the embodiment of the present application has a higher flexibility, and is conducive to achieving higher interference suppression efficiency.

The present application further provides an apparatus for executing the D2D communication method; the apparatus may be an independent apparatus, and may also be an apparatus belong to any terminal device having a directional transmission capability. According to requirements of different execution roles of the apparatus, in addition various components described in the following, the apparatus may further comprise a communication module that may implement communication with any device external to the apparatus as required. As shown in FIG. 4(*a*), a D2D communication apparatus 400 of the embodiment of the present application comprises: a second reception module 420 and a D2D communication module 440.

The second reception module 420 is configured to receive a power control strategy associated with directional transmission of a D2D communication link.

As described with reference to FIG. 1, for the terminal device having the directional transmission capability, a directional D2D communication link may be established, and directed to the directional D2D communication link, a power control strategy of the D2D transmit power which is not limited by the interference condition of a co-frequency cellular user or is less limited by the interference condition of the co-frequency cellular user may be determined, and such a power control strategy is different from a power control strategy not related to the directional D2D transmission. The power control not related to the directional transmission may be concerned only with limiting the transmit power of the D2D signal is limited, and it is needed to, for example, make a specific limitation strategy to the transmit power of the D2D signal according to the interference condition of the co-frequency cellular user the implementation process of which is complex. In the apparatus of this embodiment, a corresponding power control strategy from the serving cell base station side is received in order to implement the directional D2D transmission.

The D2D communication module 440 is configured to perform the D2D communication at least according to the power control strategy, for example, emit a directional D2D signal with a power not exceeding an transmit power upper limit specified in the power control strategy.

In view of the foregoing, the apparatus of this embodiment implements the directional D2D communication according to the power control strategy associated with the directional transmission, thereby having higher interference suppression efficiency.

Still as described with reference to FIG. 1, the establishment of the directional D2D communication link may be initiated by the base station side, and may also be initiated by sending a D2D communication request to the base station side in response to a D2D communication requirement between terminal devices, in order to acquire a resource associated with conducting the D2D communication. In such an example embodiment, as shown in FIG. 4(*b*), the apparatus 400 of this embodiment may further comprise:

a second sending module 412, configured to send request information associated with establishment of the D2D communication link.

Still as described in the foregoing embodiment, the power control strategy is determined in response to that at least one party in both parties of communication has the directional transmission capability. In an example embodiment, the apparatus of this embodiment may comprise the information associated with the directional transmission capability of the device of at least one party in the both parties of communication in the request information, for example, it is clearly indicated in the request information that the device of at least one party can conduct directional transmit, so that the base station side can determine, according to the request information, that the both parties of communication support the directional D2D transmission, thereby determining that the directional D2D communication link can be established. In another example embodiment, in response to a query of the base station side, information associated with the directional transmission capability of the device of any party in both parties of communication may be reported to the base station side. In such an example embodiment, as shown in FIG. 4(c), the apparatus 400 of this embodiment may further comprise: a third reception module 432 and a third sending module 434.

The third reception module 432 is configured to receive a query associated with the directional transmission capability of at least one party of the both parties of communication.

The third sending module 434 is configured to send information associated with the directional transmission capability of at least one party of the both parties of communication.

In still another example embodiment, the apparatus of the embodiment of the present application may comprise information associated with using directional transmission over the D2D communication link in the request information, and the information indicates that the D2D communication link related to the directional transmission, that is, indirectly indicates that at least one party in the both parties of communication has the directional transmission capability.

The information associated with using the directional transmission over the D2D communication link comprises information associated with at least one of the following: a sender device in of the D2D communication link will use directional emission over the D2D communication link, a directional coefficient of the directional transmit, the sender device uses a beam forming technology over the D2D communication link, or any other information that can indicate the D2D communication link involves the directional transmission.

It should be noted that, the both parties implementing the directional D2D transmission first should have the capability of supporting the D2D communication, the apparatus of this embodiment will respond to this when the base station side confirms this, and this process is a relatively mature technology in the art, which is not repeated herein.

Moreover, still as described with reference to FIG. 1, in the apparatus of this embodiment, the power control strategy may comprise: a transmit power upper limit at least associated with a target receiving power of the serving cell base station of the D2D communication link; a D2D signal transmit power upper limit at least associated with the maximum transmit power of a sender device of the D2D communication link, for example, the D2D signal transmit power upper limit does not exceed the maximum transmit power of the sender device; a transmit power upper limit at least associated with the interference condition of the serving cell base station of the D2D communication link; a transmit power upper limit at least associated with the interference condition of a neighboring cell base station of the D2D communication link; and/or a transmit power upper limit at least associated with positions of both parties of communication.

In an example embodiment that the power control strategy comprises a transmit power upper limit at least associated with positions of both parties of communication, the apparatus of this embodiment may further comprise a module configured to report the information associated with the positions of the both parties of communication to the base station.

In view of the foregoing, the apparatus of this embodiment may implement D2D communication according to a more flexible power control strategy.

The methods and apparatus of the embodiments of the present application are further described through specific examples.

A terminal device A and a terminal device B need to conduct D2D communication, and a process of implementing the D2D communication according to the method and apparatus of this embodiment is described as follows.

Each terminal sends a message to a network base station side to inform the network base station side that it has a capability of supporting D2D communication, and this process may be implemented when the terminal device A and the terminal device B attach to a cellular cell.

The terminal device A sends a D2D initialization message carrying a target terminal (B) to the base station side, and requests for establishing a D2D communication link between the terminal device A and the terminal B.

The base station determines, according to the known D2D communication capabilities of A and B, whether A and B both support the D2D communication. If yes, a directional transmission capability query message is sent to A; otherwise, the establishment of the D2D link fails, and the process ends.

A reports information associated with that it has the directional transmission capability to the base station.

The base station determines to establish a directional D2D communication link between the two terminals A and B, allocates an idle time-frequency resource for the link, and determines, according to positions between the two terminals A and B, that the directional D2D transmission between the two terminals A and B will not interfere an uplink signal of a cellular user, thereby further determining that a transmit power upper limitation of a directional D2D signal is the maximum transmit power of the emission device A.

The terminals A and B D2D signals according to negotiation of the both parties under power control of the base station.

Figure 5:
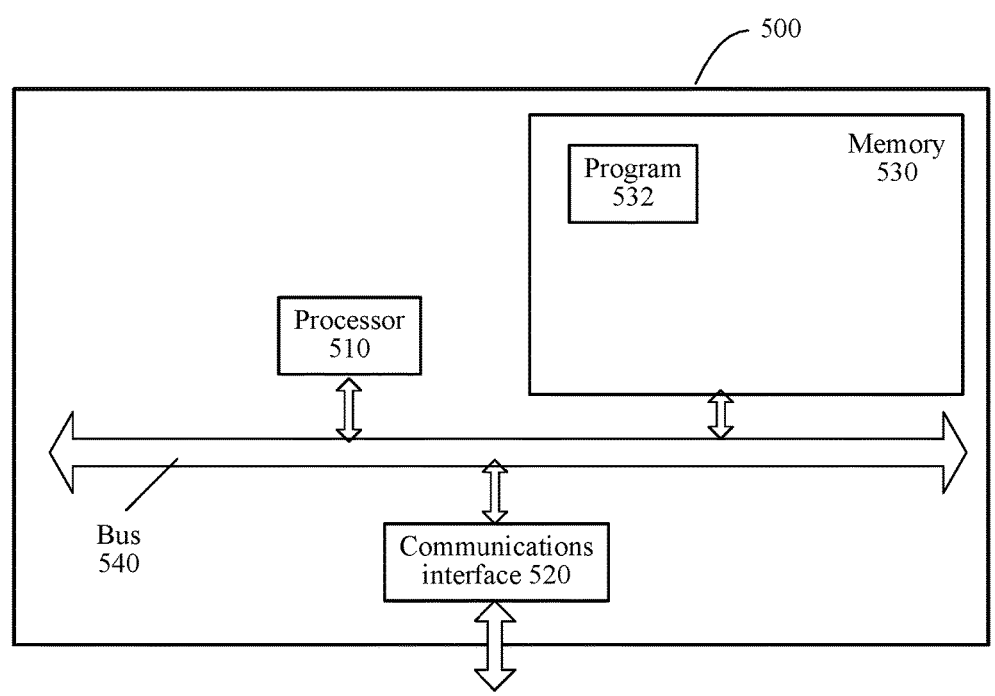
FIG. 5 is an example schematic structural diagram of another example of a D2D communication control apparatus according to an embodiment of the present application.

FIG. 5 is a schematic structural diagram of a D2D communication control apparatus 500 provided in an embodiment of the present application, and the specific implementation of the D2D communication control apparatus 500 is not limited in the implementation of the present application. As shown in FIG. 5, the D2D communication control apparatus 500 may comprise:

A processor 510, a communications interface 520, a memory 530, and a communications bus 540, where:

The processor 510, the communications interface 520, and the memory 530 complete mutual communications with each other through the communications bus 540.

The communications interface 520 is configured to communicate with a network element such as a client.

The processor 510 is configured to execute a program 532, and specifically can implement related functions of the D2D communication control apparatus in the apparatus embodiment of FIG. 3(a).

Specifically, the program 532 may comprise a program code. The program code comprises a computer operating instruction.

The processor 510 may be a central processing unit CPU or an Application Specific Integrated Circuit (ASIC), or be configured to be one or more integrated circuits configured to implement the embodiments of the present application. The program 532 may specifically used to cause the D2D communication control apparatus 500 to execute the following steps:

in response to that at least one party in both parties of communication has a directional transmission capability, determining to establish a D2D communication link using directional transmission; and determining a power control strategy associated with the directional transmission of the D2D communication link.

In this regard, all steps in the program 532 may be referred to in the corresponding descriptions of the corresponding steps or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

Figure 6:
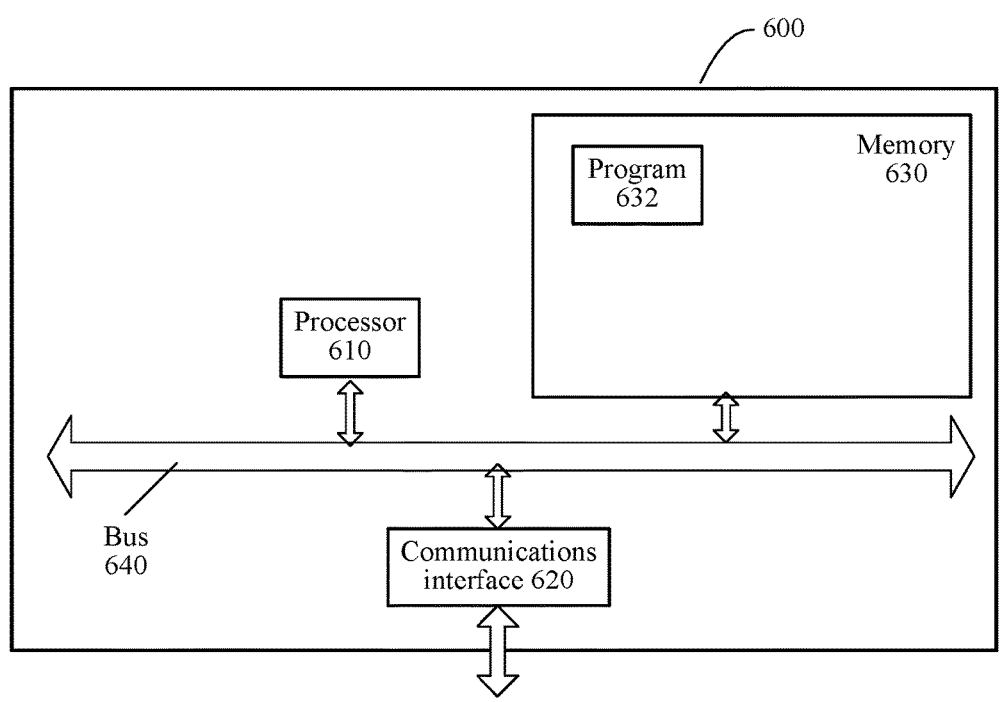
FIG. 6 is an example schematic structural diagram of another example of a D2D communication apparatus according to an embodiment of the present application.

FIG. 6 is a schematic structural diagram of a D2D communication apparatus 600 provided in an embodiment of the present application, and the specific implementation of the D2D communication apparatus 600 is not limited in the implementation of the present application. As shown in FIG. 6, the D2D communication apparatus 600 may comprise:

A processor 610, a communications interface 620, a memory 630, and a communications bus 640, where:

The processor 610, the communications interface 620, and the memory 630 complete mutual communications with each other through the communications bus 640.

The communications interface 620 is configured to communicate with a network element such as a client.

Figure 4A:
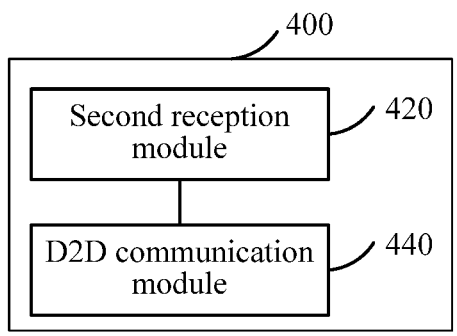
FIG. 4(a) to FIG. 4(c) are example schematic structural diagrams of various examples of a D2D communication apparatus according to an embodiment of the present application.
Figure 4B:
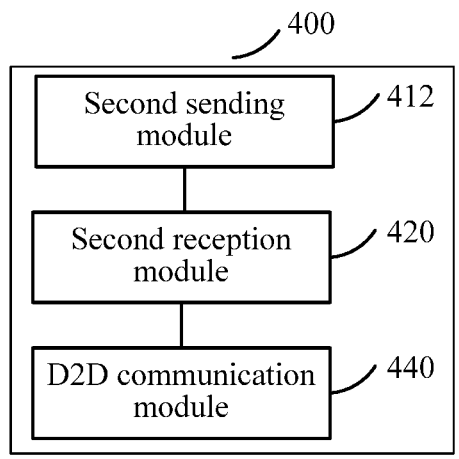
Figure 4C:
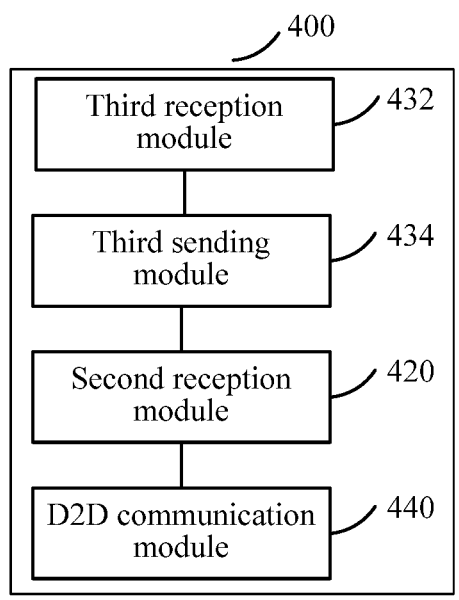

The processor 610 is configured to execute a program 632, and specifically can implement related functions of the D2D communication apparatus in the apparatus embodiment of FIG. 4(a).

Specifically, the program 632 may comprise a program code. The program code comprises a computer operating instruction.

The processor 610 may be a central processing unit CPU or an Application Specific Integrated Circuit (ASIC), or be configured to be one or more integrated circuits configured to implement the embodiments of the present application. The program 532 may specifically used to cause the D2D communication 600 to execute the following steps:

receiving a power control strategy associated with the directional transmission of the D2D communication link; and implementing D2D communication at least according to the power control strategy.

In this regard, all steps in the program 632 may be referred to in the corresponding descriptions of the corresponding steps or units in the above embodiments, and are not repeated herein. It can be clearly understood by persons skilled in the art that, for the purpose of convenient and brief description, for a detailed working process of the described devices and modules, reference may be made to the corresponding process in the foregoing method embodiment, and the details will not be described herein again.

It can be clearly understood by persons skilled in the art that, for the purpose of convenient and brief description, for a detailed working process of the described devices and modules, reference may be made to the corresponding descriptions in the foregoing apparatus embodiment, and the details will not be described herein again.

Although the theme described herein is provided in a general context executed in combination with the operating system and execution of an application on a computer system, a person skilled in the art may know that other implementations may also be executed in combination with other types of program modules. Generally speaking, the program module comprises a routine, a program, a component, a data structure and other types of structures used to execute a specific task or implement a specific abstract data type. A person skilled in the art may understand that, the theme described herein may be implemented by using another computer system configuration, comprising a handheld device, a multi-processor system, a micro-processor based or programmable consumer electronic product, a small-size computer, a large-size computer, and the like, and may also be used in a distributed computing environment in which a task is executed by using remote processing devices connection through a communications network. In the distributed computing environment, the program module may be located in storage devices of both a local memory and a remote memory.

Persons of ordinary skill in the art should appreciate that, in combination with the examples described in the embodiments herein, units and method steps can be implemented by electronic hardware, or a combination of computer software and electronic hardware. Whether the functions are executed by hardware or software depends on specific applications and design constraint conditions of the technical solutions. Persons skilled in the art can use different methods to implement the described functions for every specific application, but it should not be considered that this implementation goes beyond the scope of the present application.

When being implemented in the form of a software functional unit and sold or used as a separate product, the functions may be stored in a computer-readable storage medium. Based on such understanding, the technical solutions of the present invention essentially, or the part contributing to the prior art, or part of the technical solutions may be implemented in a form of a software product. The computer software product is stored in a storage medium, and comprises several instructions for instructing a computer device (which may be a personal computer, a server, a network device, and the like) to execute all or part of the steps of the method described in each of the embodiments of the present application. The computer readable storage medium comprises a physically volatile and non-volatile, mobile, and non-mobile medium that is implemented by any manner or technology for storing information such as a computer readable instruction, a data structure, a program module, or other data. The computer readable storage medium specifically comprises, but is not limited to, a USB disk, a mobile hard disk, a Read-Only Memory (ROM), a Random Access Memory (RAM), an Erasable Programmable Read-Only Memory (EPROM), an electrically Erasable Programmable Read-Only Memory (EEPROM), a flash memory or another solid-state memory technology, a CD-ROM, a digital versatile disc (DVD), an HD-DVD, a Blue-Ray or another optical storage device, a magnetic tape, a magnetic disk storage or another magnetic storage device, or any other medium that can be used to store required information and can be accessed by the computer.

The aforementioned description of the example embodiments are merely provided for describing the present application, but not intended to limit the present application. Persons of ordinary skills in the art can also make many variations and changes without departing from the spirit and the scope of the present application. Therefore, all the equivalent technical solutions also fall within the scope of the present application, and the patent protection scope of the present application shall be limited by the claims.

What is claimed is:

1. A method, comprising:
in response to determining that at least one party in both parties of a communication has a directional transmission capability, determining, by a system comprising a processor, to establish a device to device (D2D) communication link using directional transmission; and
determining a power control strategy associated with the directional transmission of the D2D communication link, wherein the determining the power control strategy is implemented based only on positions of the both parties of the communication when a distance between the both parties of the communication is less than a distance between a serving cell base station of the D2D communication link and each party of the both parties of the communication.

2. The method of claim 1, further comprising:
receiving request information associated with establishment of the D2D communication link; and
in response to the receiving the request information, determining a directional transmission capability of the at least one party.

3. The method of claim 2, wherein the request information comprises: information associated with the directional transmission capability of the at least one party.

4. The method of claim 2, wherein the determining the directional transmission capability of the at least one party comprises:
sending a query associated with the directional transmission capability; and
receiving information associated with the directional transmission capability of the at least one party.

5. The method of claim 2, wherein the request information comprises: information associated with using the directional transmission over the D2D communication link; and
the determining the directional transmission capability of the at least one party comprises:
in response to determining that the request information comprises the information associated with using the directional transmission over the D2D communication link, determining that the at least one party has the directional transmission capability.

6. The method of claim 5, wherein the information associated with using the directional transmission over the D2D communication link comprises information associated with at least one of a first indication that a sender device of the both parties of the communication is to use the directional transmission over the D2D communication link, a directional coefficient of the directional transmission, or a second indication that the sender device uses beam forming over the D2D communication link.

7. The method of claim 1, wherein, the determining the power control strategy comprises:
determining a transmit power upper limit at least associated with a target received power of a serving cell base station device of the D2D communication link.

8. The method of claim 1, wherein the determining the power control strategy comprises:
determining a transmit power upper limit at least associated with a maximum transmit power of a sender device of the both parties of the communication.

9. The method of claim 1, wherein the determining the power control strategy comprises:
determining a transmit power upper limit at least associated with an interference condition of a serving cell base station device of the D2D communication link.

10. The method of claim 1, wherein the determining the power control strategy comprises:
determining a transmit power upper limit at least associated with an interference condition of a neighboring cell base station device of the D2D communication link.

11. The method of claim 1, wherein, the determining the power control strategy comprises:
determining a transmit power upper limit at least associated with positions of the both parties of the communication.

12. The method of claim 1, further comprising:
sending information associated with the power control strategy.

13. A method, comprising:
receiving, by a system comprising a processor, a power control strategy associated with a directional transmission of a device-to-device (D2D) communication link; and
performing D2D communication at least according to the power control strategy, wherein the power control strategy is determined according to only positions of a sender device and a receiver device of the D2D communication link when a distance between the sender device and the receiver device is less than a distance between a serving cell base station device of the D2D communication link and both the sender device or the receiver device.

14. The method of claim 13, further comprising:
sending request information associated with establishment of the D2D communication link.

15. The method of claim 14, wherein the request information comprises: information associated with a directional transmission capability of at least one party in both parties of a communication.

16. The method of claim 14, wherein the request information comprises: information associated with using the directional transmission on the communication link.

17. The method of claim 13, further comprising:
receiving a query associated with a directional transmission capability of at least one party in both parties of a communication; and
sending information associated with the directional transmission capability of the at least one party in the both parties of the communication.

18. The method of claim 16, wherein the information associated with using the directional transmission over the D2D communication link comprises information associated with at least one of a sender device of the both parties of the communication that uses the directional transmission over the D2D communication link, a directional coefficient of the directional transmission, or the sender device that uses beam forming over the D2D communication link.

19. The method of claim 13, wherein the power control strategy further comprises:
a transmit power upper limit at least associated with a target received power of a serving cell base station device of the D2D communication link.

20. The method of claim 13, wherein the power control strategy further comprises:
a transmit power upper limit at least associated with a maximum transmit power of a sender device of the D2D communication link.

21. The method of claim 13, wherein the power control strategy further comprises:
a transmit power upper limit at least associated with an interference condition of a serving cell base station device of the D2D communication link.

22. The method of claim 13, wherein the power control strategy further comprises:
a transmit power upper limit at least associated with an interference condition of a neighboring cell base station device of the D2D communication link.

23. The method of claim 13, wherein the power control strategy further comprises:
a transmit power upper limit at least associated with respective positions of sender and receiver devices of the D2D communication link.

24. An apparatus, comprising:
a memory that stores executable modules; and
a processor, coupled to the memory, that executes or facilitates execution of the executable modules, the executable modules comprising:
a first determination module configured to determine to establish a device to device (D2D) communication link using a directional transmission in response to a determination that at least one party in both parties of a communication has a directional transmission capability; and
a second determination module configured to determine a power control strategy associated with the directional transmission of the D2D communication link, wherein the determining the power control strategy is implemented based only on positions of the both parties of the communication when a distance between the both parties of the communication is less than a distance between a serving cell base station of the D2D communication link and each party of the both parties of the communication.

25. The apparatus of claim 24, wherein the executable modules further comprise:
a first reception module configured to receive request information associated with establishment of the D2D communication link; and
a third determination module configured to: in response to the request information being received, determine the directional transmission capability of the at least one party in the both parties of the communication.

26. The apparatus of claim 25, wherein the third determination module comprises:
a sending unit configured to send a query associated with the directional transmission capability; and
a reception unit configured to receive information associated with the directional transmission capability of the at least one party in the both parties of the communication.

27. The apparatus of claim 25, wherein the third determination module is configured to: in response to a determination that the request information comprises the information associated with using the directional transmission over the D2D communication link, determine that the at least one party in the both parties of the communication has the directional transmission capability.

28. The apparatus of claim 24, wherein the first determination module is configured to determine a transmit power upper limit at least associated with a target receiving power of a serving cell base station device of the D2D communication link.

29. The apparatus of claim 24, wherein the first determination module is configured to determine a transmit power upper limit at least associated with a maximum transmit power of a sender device of the D2D communication link.

30. The apparatus of claim 24, wherein the first determination module is configured to determine a transmit power upper limit at least associated with an interference condition of a serving cell base station device of the D2D communication link.

31. The apparatus of claim 24, wherein the first determination module is configured to determine a transmit power upper limit at least associated with an interference condition of a neighboring cell base station device of the D2D communication link.

32. The apparatus of claim 24, wherein the first determination module is configured to determine a transmit power upper limit at least associated with positions of the both parties of the communication.

33. The apparatus of claim 24, wherein the executable modules further comprise:
a first sending module configured to send information associated with the power control strategy.

34. An apparatus, comprising:
a memory that stores executable modules; and
a processor, coupled to the memory, that executes or facilitates execution of the executable modules, the executable modules comprising:
a first reception module configured to receive a power control strategy associated with a directional transmission of a device to device (D2D) communication link; and
a D2D communication module configured to perform a D2D communication at least according to the power control strategy, wherein the determining the power control strategy is implemented based only on positions of the both parties of the communication when a distance between the both parties of the communication is less than a distance between a serving cell base station of the D2D communication link and each party of the both parties of the communication.

35. The apparatus of claim 34, wherein the executable modules further comprise:
a first sending module configured to send request information associated with establishment of the D2D communication link.

36. The method of claim 34, wherein the executable modules further comprise:
a second reception module configured to receive a query associated with the directional transmission capability of at least one party of both parties of a communication; and
a first sending module configured to send information associated with the directional transmission capability of the at least one party of the both parties of the communication.

37. A non-transitory computer readable medium, comprising at least one executable instruction, which, in response to execution, causes a system comprising a processor to perform operations, comprising:
in response to determining that at least one party in both parties of communication has a directional transmission capability, determining to establish a device to device (D2D) communication link using directional transmission; and determining a power control strategy associated with the directional transmission of the D2D communication link, wherein the determining the power control strategy is implemented based only on positions of the both parties of the communication when a distance between the both parties of the communication is less than a distance between a serving cell base station of the D2D communication link and each party of the both parties of the communication.

38. A device for device to device (D2D) communication control comprising a processor and memory, wherein the memory stores executable instructions, the processor being connected with the memory via a communication bus, and when the device is operating, the processor executes or facilitates execution of the executable instructions stored by the memory to perform operations, comprising:

in response to determining that at least one party in both parties of a communication has a directional transmission capability, determining to establish a D2D communication link using directional transmission; and determining a power control strategy associated with the directional transmission of the D2D communication link, wherein the determining the power control strategy is implemented based only on positions of the both parties of the communication when a distance between the both parties of the communication is less than a distance between a serving cell base station of the D2D communication link and each party of the both parties of the communication.

39. A non-transitory computer readable medium, comprising at least one executable instruction, which, in response to execution, causes a system comprising a processor to perform operations, comprising:

receiving a power control strategy associated with directional transmission of a device to device (D2D) communication link; and initiating a D2D communication at least according to the power control strategy, wherein the power control strategy is determined according to only positions of a sender device and a receiver device of the D2D communication link when a distance between the sender device and the receiver device is less than a distance between a serving cell base station device of the D2D communication link and both the sender device or the receiver device.

40. A device to device (D2D) communication device comprising a processor and memory, wherein the memory stores executable instructions, the processor being connected with the memory via a communication bus, and when the device is operating, the processor executes or facilitates execution of the executable instructions stored by the memory to perform operations, comprising:

receiving a power control strategy associated with directional transmission of a D2D communication link; and performing D2D communication at least according to the power control strategy, wherein the power control strategy is determined according to only positions of a sender device and a receiver device of the D2D communication link when a distance between the sender device and the receiver device is less than a distance between a serving cell base station device of the D2D communication link and both the sender device or the receiver device.

* * * * *